May 27, 1924.

A. M. MacFARLAND 1,495,703

DIFFERENTIAL COUPLING DEVICE

Filed Oct. 30, 1920

Allis M. MacFarland
INVENTOR.

BY D. C. Davis
ATTORNEY

Patented May 27, 1924.

1,495,703

UNITED STATES PATENT OFFICE.

ALLIS M. MacFARLAND, OF WILKINSBURG, PENNSYLVANIA, ASSIGNOR TO WESTINGHOUSE GEAR AND DYNAMOMETER COMPANY, A CORPORATION OF PENNSYLVANIA.

DIFFERENTIAL COUPLING DEVICE.

Application filed October 30, 1920. Serial No 420,720.

*To all whom it may concern:*

Be it known that I, ALLIS M. MACFARLAND, a citizen of the United States, and a resident of Wilkinsburg, in the county of Allegheny and State of Pennsylvania, have invented a new and useful Improvement in Differential Coupling Devices, of which the following is a specification.

My invention relates to gearing systems as are commonly employed for transmitting power from relatively high speed turbines to relatively low speed consumption devices, such as direct-current generators or propellers, and it has for its object to provide apparatus of the character designated which shall be simple, compact and rugged in construction, and which shall be effective in operation, particularly in providing for a substantially equal division of load and thrust among the different members of a gearing system, irrespective of slight defects in the gear teeth themselves or of warping and twisting of the gear frame work.

Figure 1:
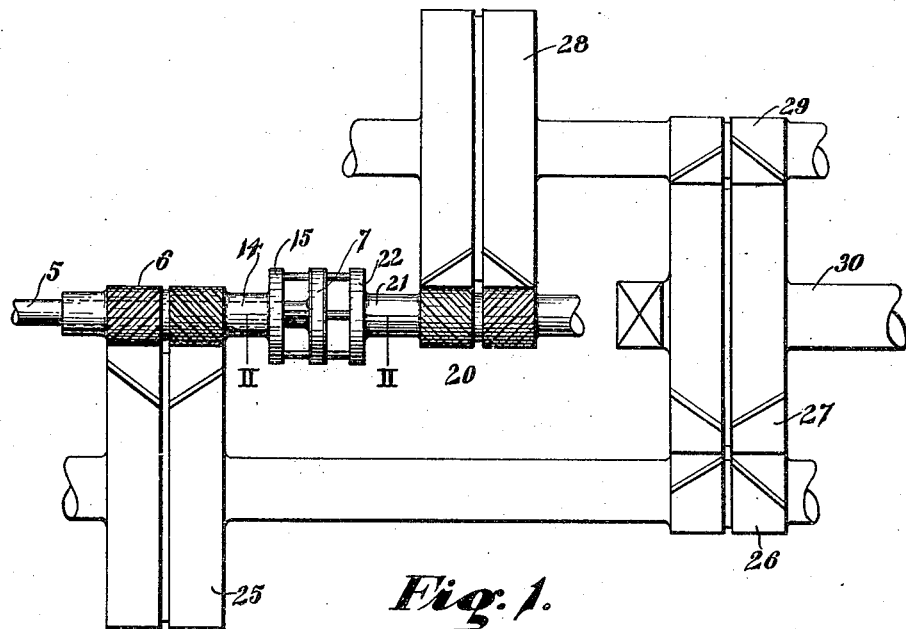
Figure 2:
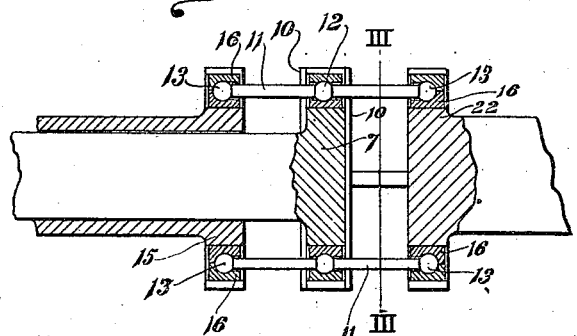
Figure 3:
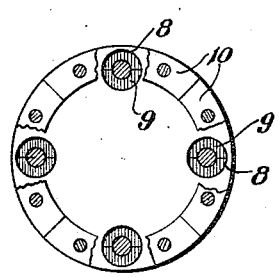

In the accompanying drawing, Fig. 1 is a diagrammatic view of a turbine system embodying one form of my invention; Fig. 2 is a fragmentary sectional view of the apparatus shown in Fig. 1 taken on the plane II—II thereof; and Fig. 3 is a similar fragmentary sectional view taken on the plane III—III in Fig. 2.

It has become common practice, in conjunction with relatively high speed prime movers, such, for example, as steam turbines, to employ systems of reduction gearing, as, for example, in the driving of direct current generators and in ship propulsion. These gears are usually of the double helical type, the respective helices being opposed to each other in order to neutralize the end thrust. In order to secure a relatively great reduction in speed, it has been found desirable to employ two or more reductions in order to avoid the use of abnormally large gears and of abnormally small pinions.

In double reduction systems, particularly those employed on ship board, it is common practice to effect the first reduction by means of two separate and distinct gearing systems, each of which drives a pinion on a common gear for the final reduction and it is the specific purpose of this invention to provide means for equalization of the load between these two primary reduction sets, irrespective of slight inaccuracies in the cutting and assembly of the gears and irrespective of the deformation of the frame work caused, for example, by the weaving of a ship in a heavy sea. I secure this load equalization by means of a system of equalizing levers in many respects similar to those shown in my copending application, Serial No. 420,719 filed October 30, 1920, and assigned to the Westinghouse Gear and Dynamometer Company.

Referring to the drawing for a more detailed understanding of my invention, I show a drive shaft at 5 in Fig. 1 connected, for example, to a steam turbine. The shaft 5 projects through a hollow pinion 6 of the double opposed helical type and carries a flange 7 at its end, as shown more clearly in Fig. 2. The flange 7 is provided with a plurality of circular openings 8 therethrough, shown as four in number, and in each of these openings is seated a split bushing 9 hollowed out to provide a spherical seat in its central portion. The bushings 9—9 are retained in place by suitable cover plates 10—10.

Equalizing bars 11—11 are carried within the bushings 9—9, each equalizing bar having a spherical enlargement 12 adapted to be retained within the spherical seat formed in the bushing 9—9 and each equalizing bar further having a spherical knob 13 at each end.

The pinion 6, through which the drive shaft projects, has an extended hub 14 carrying a flange 15 facing the flange 7 and in this flange are mounted split bushings 16—16 adapted to receive the ends of the levers 11 projecting theretoward.

An additional pinion 20 is mounted in alignment with the shaft 5, beyond the end thereof, and is provided with a hub 21 carrying a flange 22 also facing the flange 7 and further provided with split bushings 16 for the reception of the remaining ends of the equalizing levers 11.

The pinion 6 is mounted to drive a gear 25, which in turn drives a pinion 26 meshing with a low speed gear 27. In like manner the pinion 20 drives a pinion 28, which in turn is connected to a pinion 29 also driving the low speed gear 27. With this construction, it will be obvious that the drive shaft 5 may be arranged in alignment with the low speed driven shaft 30, as is desirable in many installations, as on ship board, and furthermore, all the gearing elements are symmetrically distributed in such manner as to be accessible for inspection and repair.

With the arrangement as described, but without the equalizing levers 11, if it be assumed that the machining and assembly is perfect, one-half the load is transmitted from the shaft 5 to the shaft 30 and through the gear 28, and the remainder through the gear 25, but if, as is usually the case, there are present slight imperfections in the gear teeth, or slight inaccuracies in keying of the gears to their respective shafts, or if the frame work of the gearing system is twisted through the weaving of the ship, there results an unequal distribution of load between the two intermediate gears with a resultant unequal wear or even breakage in the case where all the load is imposed on a single intermediate gear.

With the use of the structure shown, however, all the driving is effected from the flange 7 through the equalizing levers 11—11 and the pinions 6 and 20, while maintaining the same average speed of rotation as the drive shaft 5, nevertheless are permitted to move through a slight angle with respect thereto, thus, at all times, equalizing the load transmitted to the pinions 6 and 20.

I have illustrated my invention in connection with a reduction gearing, but obviously it is susceptible of wide application, as, for example, in a system of gearing for raising speeds, or in any other case where a load is to be divided between two separate gear trains. Furthermore, while I have provided for an equal division of load by disposing the flange 7 midway between the flanges 15 and 22, if it be desired to divide the load in some other ratio, the position of the driving flange may be altered so that the lever arms of the members 11—11 bear other than a 1 to 1 ratio to each other.

While I have shown my invention in but one form, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:—

1. A reduction gear of the double-reduction type comprising a driving shaft, two high-speed pinions disposed in axial alinement with respect to the driving shaft, opposed flanges carried by the adjacent ends of the pinions, a driving flange carried by the driving shaft and disposed between the pinion flanges, said flanges being provided with recesses, bushings arranged within the recesses and being provided with spherical seats, lever members having intermediate and terminal spherical portions fitting the spherical seats of the bushings, intermediate gears meshing with said pinions, countershafts connected to the gears, intermediate pinions carried by the countershafts, and a driven gear meshing with said intermediate pinions.

2. A reduction gear of the double-reduction type comprising a driving shaft, two high-speed pinions disposed in axial alinement, an equalizing connection arranged between the pinions, connected to the driving shaft, and including connections whereby the pinions may move slightly longitudinally with respect to the driving shaft, intermediate gears meshing respectively with said pinions, countershafts connected respectively to said gears, intermediate pinions carried respectively by the countershafts, and a driven gear meshing with said intermediate pinions.

3. A reduction gear of the double-reduction type comprising a driving shaft, two high-speed pinions disposed in axial alinement with the driving shaft, a flange carried by the driving shaft and disposed between the pinions, equalizing levers for connecting the flange with the pinions, bushings carried by the flange and provided with seats for the intermediate portions of said levers, said bushings being capable of limited longitudinal movement, intermediate gears meshing respectively with said pinions, countershafts connected respectively to said gears, intermediate pinions carried respectively by the countershafts, and a driven gear meshing with the said intermediate pinions.

4. A reduction gear of the double-reduction type comprising a driving shaft, two high-speed pinions disposed in axial alinement with respect to the driving shaft, equalizing levers for connecting the driving shaft with the pinions, bushings carried by the driving shaft for the intermediate portions of said levers, means for limiting the longitudinal movement of said bushings, intermediate gears meshing respectively with said pinions, countershafts connected respectively to said gears, intermediate pinions carried respectively by the countershafts, and a driven gear meshing with said intermediate pinions.

5. A reduction gear of the double-reduction type comprising a driving shaft, two high-speed pinions disposed in axial alinement, opposed flanges carried by the pinions, a driving shaft flange arranged between the pinion flanges, two-part bushings fitting in recesses provided in the flanges and having seat portions, equalizing levers having intermediate and terminal portions to fit the seat portions of the bushings, means cooperating with the driving shaft flange for limiting endwise movement of its bushings, intermediate gears meshing respectively with said pinions, countershafts connected respectively to said gears, intermediate pinions carried respectively by the countershafts, and a driven gear meshing with said intermediate pinions.

In testimony whereof, I have hereunto subscribed my name this 27th day of October, 1920.

ALLIS M. MacFARLAND.